United States Patent [19]

Hildebrandt

[11] Patent Number: 4,585,964
[45] Date of Patent: * Apr. 29, 1986

[54] APPARATUS AND SYSTEM FOR TERMINATING THE WINDING WIRES OF A DYNAMOELECTRIC MACHINE

[75] Inventor: Eugene F. Hildebrandt, St. Louis County, Mo.

[73] Assignee: Emerson Electric Co., St. Louis, Mo.

[*] Notice: The portion of the term of this patent subsequent to Oct. 9, 2001 has been disclaimed.

[21] Appl. No.: 648,457

[22] Filed: Sep. 7, 1984

Related U.S. Application Data

[63] Continuation-in-part of Ser. No. 427,646, Sep. 29, 1982, Pat. No. 4,476,407.

[51] Int. Cl.⁴ .......................................... H02K 11/00
[52] U.S. Cl. ..................................... 310/71; 310/42; 310/68 C; 310/68 E; 310/214; 200/80 R
[58] Field of Search ............... 310/71, 42, 214, 68 C, 310/68 E, 45, 68 R, 259, 260, 254, 270; 200/80 R; 339/119 R, 125 R, 95 R, 95 D, 96, 100; 361/32; 336/192; 29/596

[56] References Cited

U.S. PATENT DOCUMENTS

| | | | |
|---|---|---|---|
| 3,518,616 | 6/1970 | Lewis | 310/71 |
| 3,725,707 | 4/1973 | Leimbach et al. | 310/71 |
| 3,782,669 | 1/1974 | Lewis | 248/14 |
| 3,979,615 | 9/1976 | Neff | 310/71 |
| 3,984,908 | 10/1976 | Ackley | 29/736 |
| 4,041,604 | 8/1977 | Ackley | 29/628 |
| 4,071,793 | 1/1978 | Cox | 310/71 |
| 4,132,460 | 1/1979 | Porta | 310/71 |
| 4,163,913 | 1/1979 | Barratt | 310/91 |
| 4,177,397 | 4/1979 | Lill | 310/71 |
| 4,181,393 | 1/1980 | Lill | 339/98 |
| 4,250,419 | 2/1981 | Zolman | 310/68 |
| 4,251,911 | 2/1981 | Reynolds et al. | 29/605 |
| 4,322,647 | 3/1982 | Neroda et al. | 310/71 |
| 4,361,773 | 11/1982 | Mokrzycki | 310/71 |
| 4,476,407 | 10/1984 | Hildebrandt et al. | 310/71 |

Primary Examiner—R. Skudy
Attorney, Agent, or Firm—Polster, Polster and Lucchesi

[57] ABSTRACT

Apparatus and system for terminating the winding wires of a dynamoelectric machine (e.g., a fractional horsepower electric motor) is disclosed in which wires (referred to as magnet wires) constituting the coils of the windings of the dynamoelectric machine are terminated in an electrically insulative block fixedly secured to the core of the motor. The magnet wires from the windings of the motor are fitted into respective receptacles of the terminal block and magnet wire terminals are forceably inserted into the receptacles so as to make electrical contact with the magnet wires and so as to securely hold the magnet wires within the terminal block. Then, other electrical connections, such as lead wires with removable terminals thereon or other electrical devices, such as a thermal protector for the motor, may be inserted into the terminals received within the receptacles of the terminal block thus eliminating the necessity of lead wire-to-magnet wire junctions and facilitating the automated assembly of the motor and the electrical connection of the terminals of the starting switch for the electric motor to the windings of the motor. An embodiment is disclosed in which a connector block is secured to the core, the connector block receiving a thermal protector and a starting switch such that all connections to the windings are carried out by the connector block.

7 Claims, 26 Drawing Figures

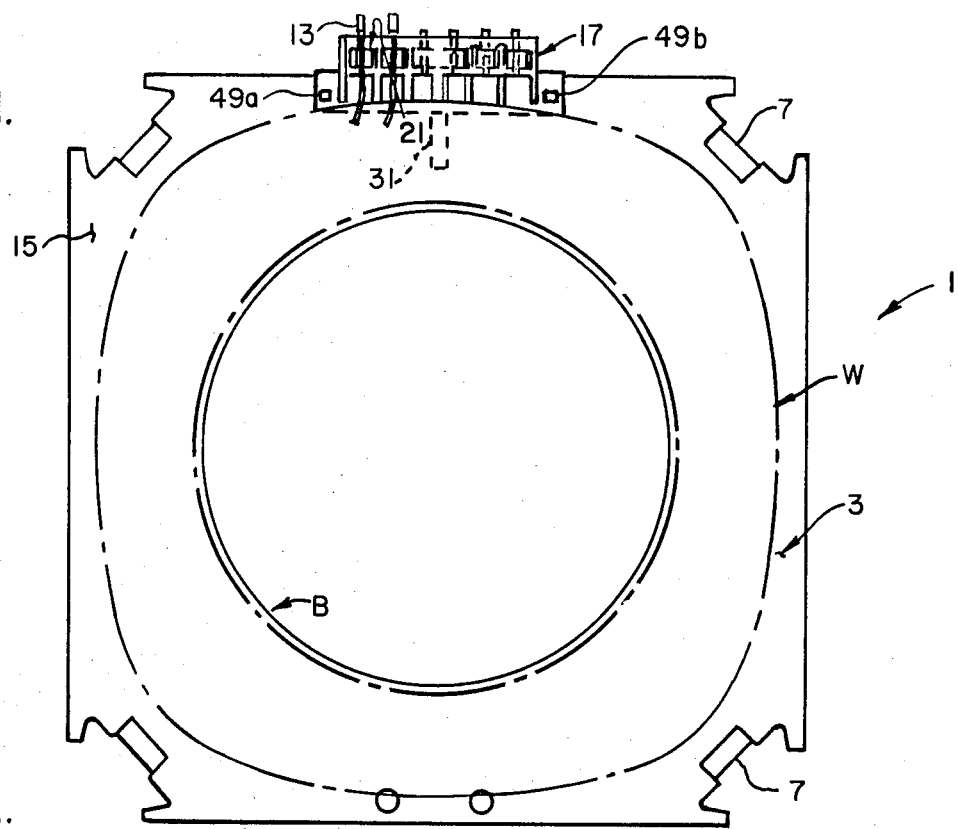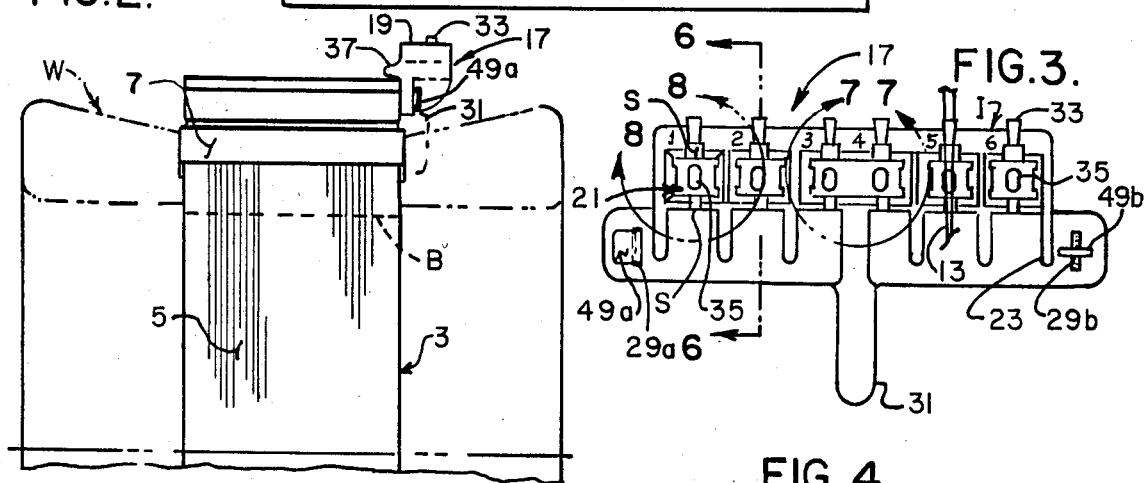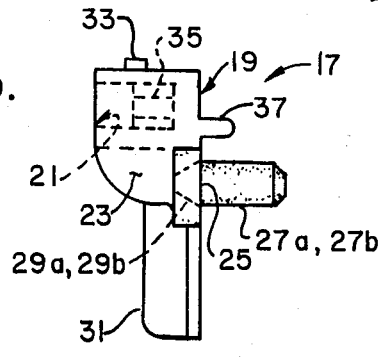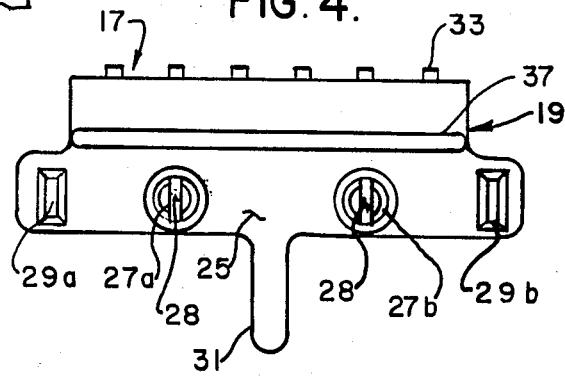

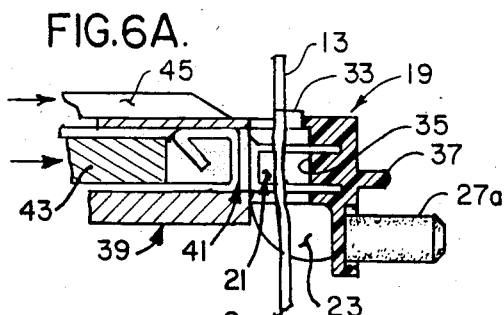
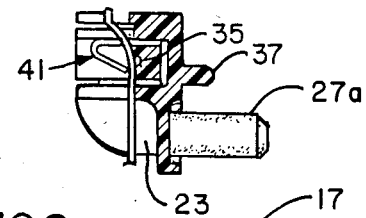
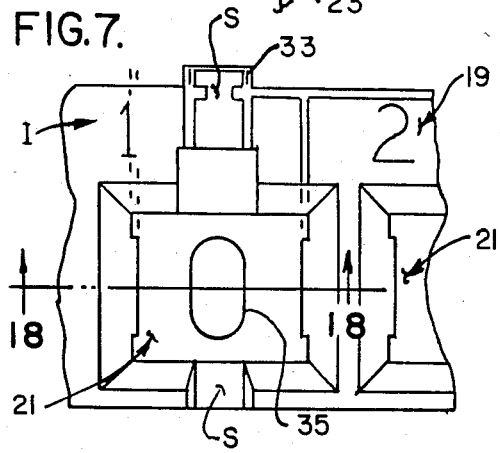
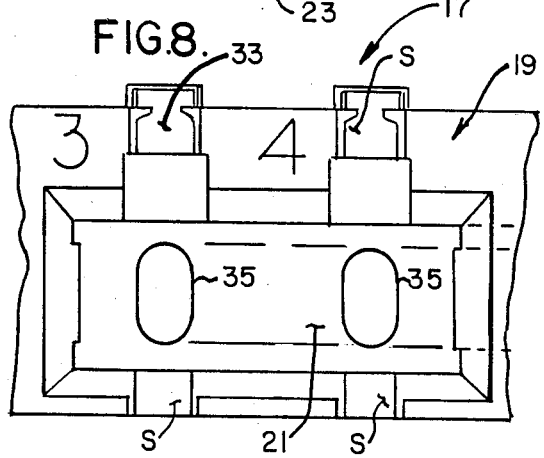
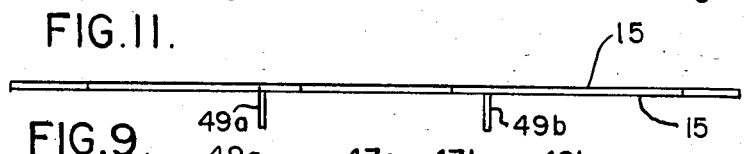
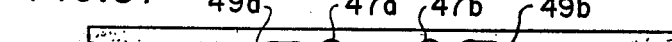
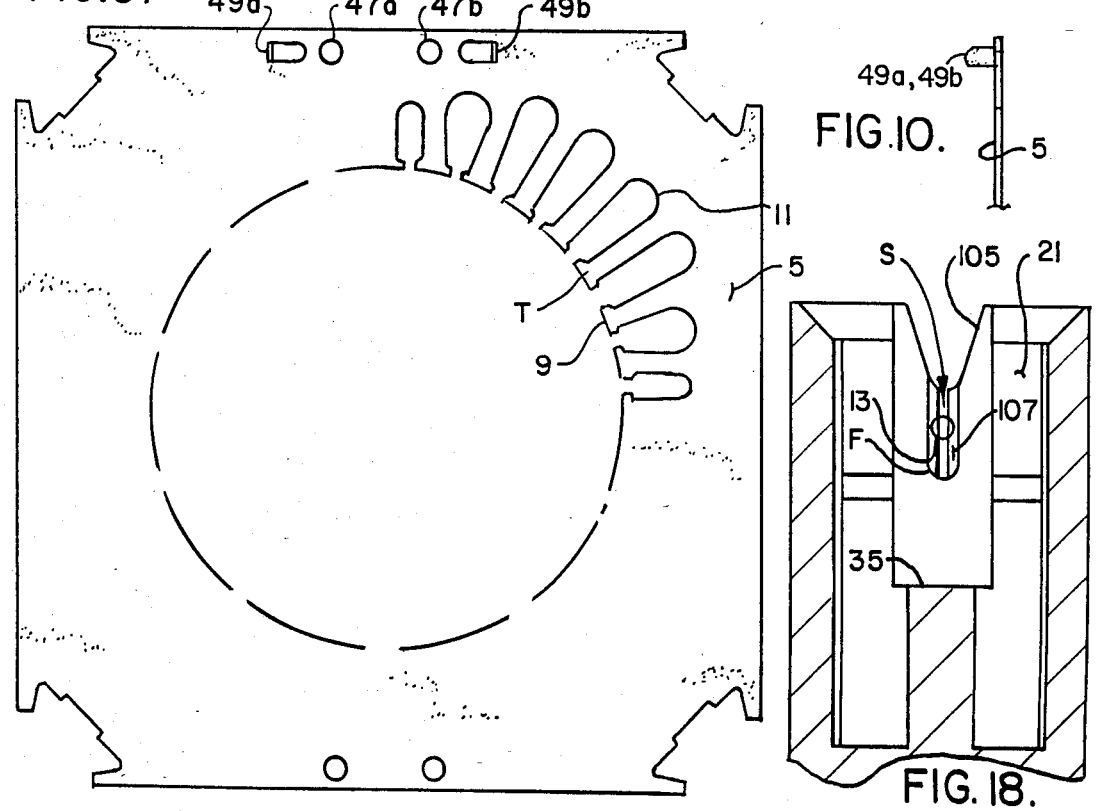
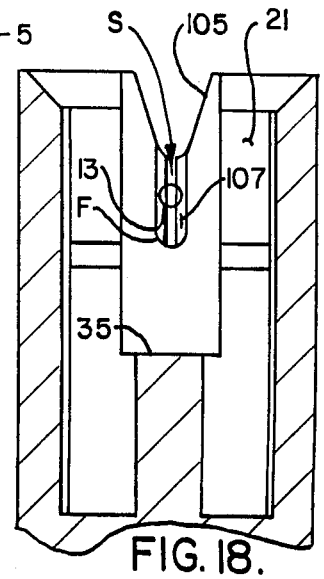

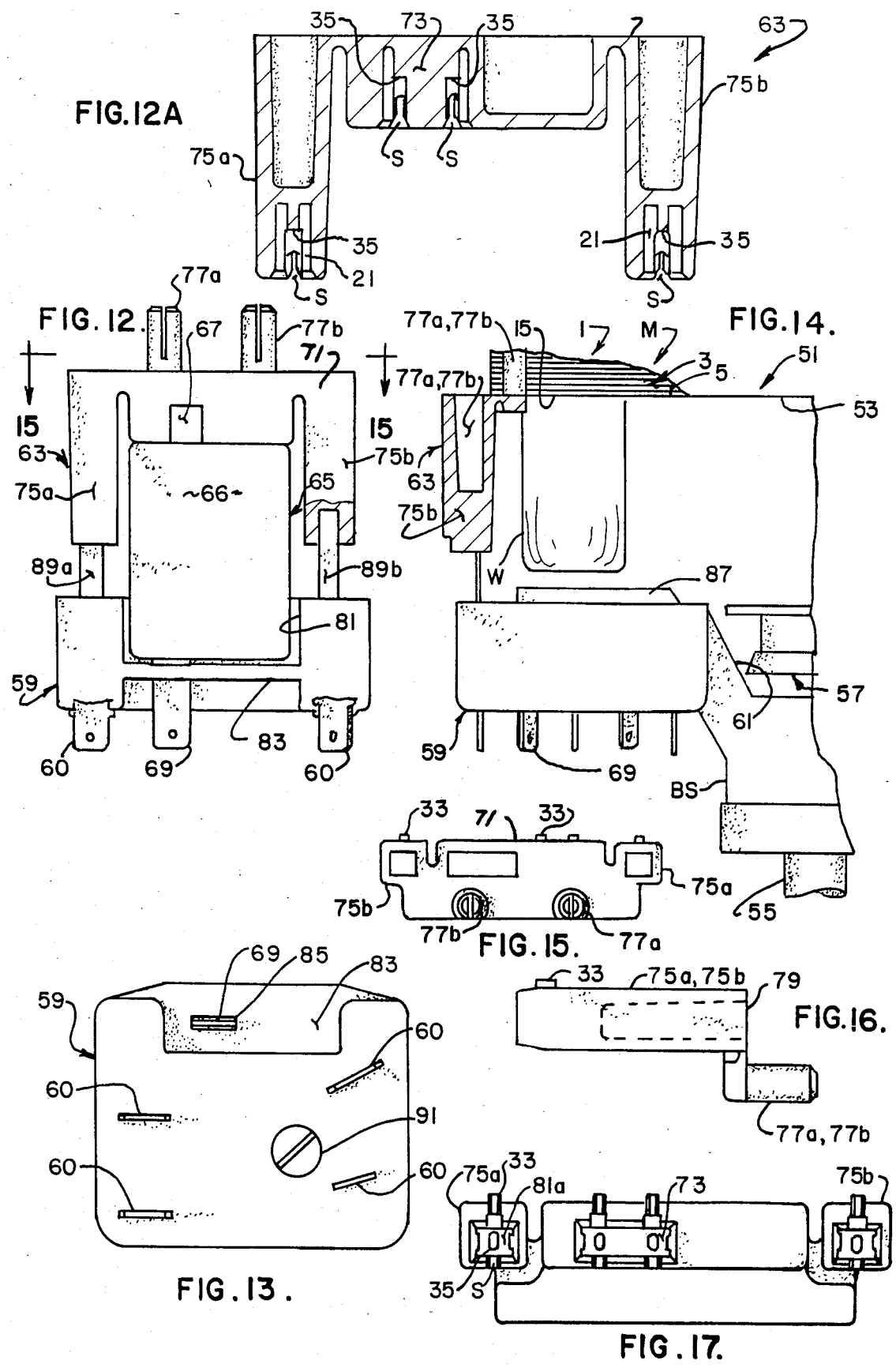

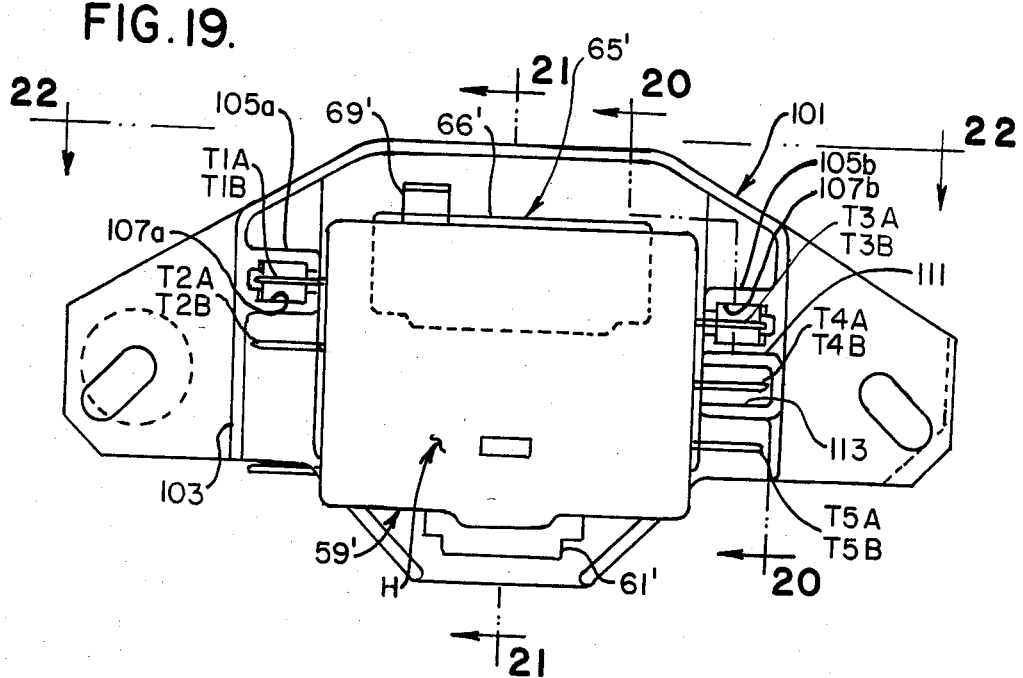
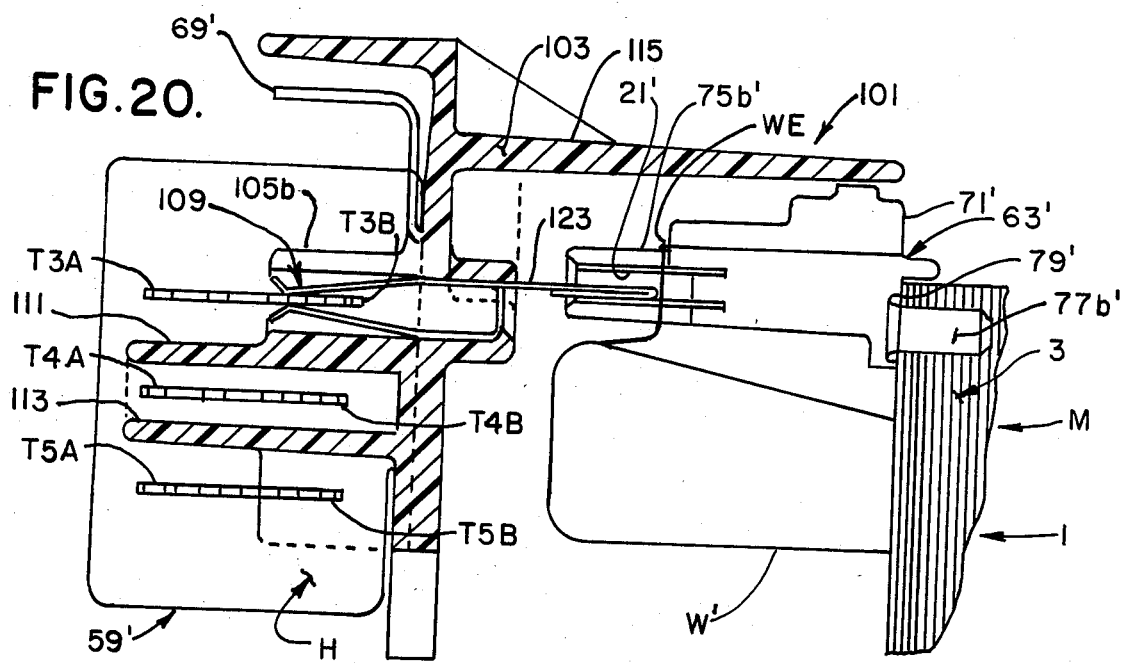
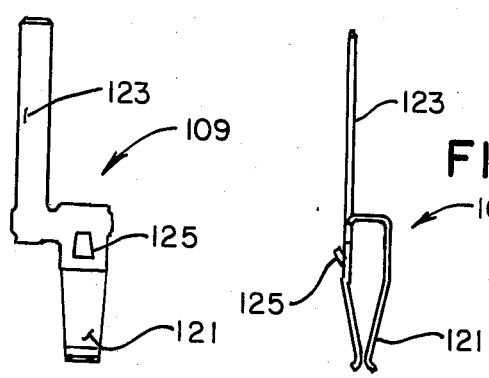
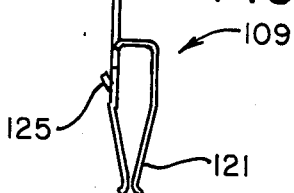

APPARATUS AND SYSTEM FOR TERMINATING THE WINDING WIRES OF A DYNAMOELECTRIC MACHINE

CROSS-REFERENCE TO RELATED APPLICATION

This is a continuation-in-part, of U.S. patent application Ser. No. 427,646, filed Sept. 29, 1982, now U.S. Pat. No. 4,476,407.

BACKGROUND OF THE INVENTION

This invention relates to apparatus and system for terminating the winding wires of a dynamoelectric machine and more specifically to such apparatus and system which enables the winding wires to be terminated in a terminal block and which permits the ready installation of other electrical components, such as a thermal protector or a starting switch for the motor.

Generally, a dynamoelectric machine, such as a fractional horsepower motor, includes a stator assembly comprised of a stack of platelike laminations punched from suitable sheet ferro-magnetic material. As is conventional, each of the laminations has a central opening therein and a plurality of blind notches or slots extending generally radially outwardly from the central opening so as to form a plurality of slots surrounding the central opening. Depending on the type and winding scheme for the motor, a plurality of coils of copper wire, referred to as magnet wire, are inserted in respective slots of the stator core so as to form the windings for the motor. For example, the windings for a typical fractional horsepower motor may include a main winding and an auxiliary winding. The magnet wire constituting the main and auxiliary windings of the motor have ends which must be connected to lead wires for properly energizing the windings of the motor so as to permit startup and operation of the motor.

Heretofore, it was conventional that the ends of the magnet wire constituting a winding of the motor would be physically connected, as by soldering or the like, to a flexible leadwire which in turn could be selectively connected to a source of electrical power. The requirement of making these junctions between the lead wire and the magnet wire was time consuming and relatively expensive. Further, these lead wire/magnet wire junctions were a potential source of failure for the motor during its service life. In an effort to eliminate the requirement of magnet wire-to-lead wire junctions, several techniques have been proposed.

In U.S. Pat. No. 3,725,707 to Leimbach et al, a pair of electrically insulative terminal blocks is affixed to the end face of the stator core of a motor and a tubular terminal is inserted into openings provided in the terminal blocks. The ends of the windings are placed in channel portions of the terminals which are then crimped over on the winding or magnet wires. Then, a lead wire with a bayonet-type terminal thereon may be inserted into the tubular portion of the terminal thereby to make electrical connection between the winding or coil wire and the leadwires. However, the system and terminals disclosed in the above-mentioned patent required that the terminals be crimped on the coil wires and this presented difficulties in automating the process.

In U.S. Pat. Nos. 3,979,615, 3,984,908 and 4,041,604, another system for electrically connecting the ends of the winding coils to the lead wires is disclosed in which the coil wires are inserted in respective slots of an electrically insulated terminal block bonded to the end face of the stator core with the coil wires extending across a receptacle. Then, a slotted terminal is forceably inserted into the receptacle whereby a slot in the terminal receives the magnet wire extending across the receptacle, and strips the electrical insulation from the outer surfaces of the magnet wire thereby to make electrical contact between the magnet wire and the terminal. Simultaneously with inserting the terminal into the receptacle of the insulative terminal block, the excess length of the magnet wire was cut off by a blade so as to present a neat installation of the magnet wire in the terminal block. The terminal has barbs or tabs thereon which positively prevent its removal from the receptacle within the terminal block. Then, a respective lead wire with a terminal thereon may be readily connected to the terminal received in the receptacle so as to electrically connect the lead wire to its respective magnet wire.

While the systems of U.S. Pat. Nos. 3,979,615, 3,984,908 and 4,041,604 overcame certain of the problems exemplified in U.S. Pat. No. 3,725,707 (i.e., eliminating the requirement of having to crimp the magnet wires to the terminals), the insulative blocks shown in U.S. Pat. Nos. 3,984,908 and 4,041,604 were relatively large injection molded plastic parts which, of necessity, had to be secured to the entire end face of one end of the stator core. Thus, these mounting blocks were relatively expensive and covered a considerable portion of the end face on the stator core. Additionally, separate fastening means were required so as to positively secure these terminal blocks to the end faces of the cores.

U.S. Pat. No. 4,071,793 and 4,177,397 disclose smaller terminal blocks which are securable onto the end faces of the stator core for receiving magnet wires from the windings of the motor for connection to lead wire terminals.

U.S. Pat. No. 4,251,911 discloses a method of terminating the coil windings of an electric motor in which, after the coil winding wires have been inserted in their slots so as to extend transversely across a respective terminal receptacle, the winding wire is successively wrapped around a so-called binding post. Then, upon insertion of the terminals into the receptacles, a blade movable with the terminals engages both the magnet wire wrapped around the binding post and severs both the wire and the binding post from the terminal block. However, this method requires that the winding wire be wrapped around the binding post.

U.S. Pat. No. 4,322,647 discloses still another type of terminal block which is secured to one end face of the coil.

Still another problem present in the manufacture of dynamoelectric machines, and particularly in the manufacture of fractional horsepower motors, is the problem of connecting a so-called thermal protector to the windings. Typically, a thermal protector carries the current to the main windings of the motor and is sensitive to the operating temperature of the motor and to the amount of current flowing through the windings so that in the event the current flowing through the windings becomes excessive (such as in the event of a locked rotor or the like), the thermal protector will open the circuit to the main windings thus interrupting the flow of current. Oftentimes, after the windings and the thermal protector have cooled below a predetermined temperature level, the thermal protector will reset thus allowing the electric motor to restart.

While certain thermal protectors are miniaturized devices which may be incorporated in the windings of the motor, it is more typical, especially on larger size fractional horsepower motors (e.g., one quarter horsepower and above) which are conventionally used in many home appliances such as in clothes dryers, washing machine motors, dishwashers and the like, that the thermal protector be of relatively large size and have relatively large terminals so as to readily accommodate the flow of current through the motor windings. While these thermal protectors may vary considerably in size depending on the model, the manufacturer, and the load rating of the protectors, a typical size of the protector may, for example, be about 1.38 inches (3.5 cm.) long by 1 inch (2.54 cm.) wide and about ¼ inch (0.64 cm.) thick. Oftentimes these thermal protectors are mounted on the starting switch, the end shields or other convenient structure of the electric motor.

Various arrangements for mounting the motor's starting switch for proper operation of the starting switch by a centrifugal actuator have been proposed. For example, in the coassigned U.S. Pat. No. 3,782,669, a bracket is provided on which the starting switch is mounted and this bracket serves to mount the thermal protector in close proximity to the starting switch so that electrical connections between the thermal protector and the starting switch may be readily made.

U.S. Pat. No. 4,163,913 discloses a motor protector mount which is installed in the motor and which is specifically designed to mount the thermal protector in a desired location within the motor.

U.S. Pat. No. 4,250,419 discloses a holder for an overload protector which includes a so-called thermal protector pocket member of formed sheet metal construction which is slipped into place between the end turn bundles of the windings. Then the thermal protector is inserted into a pocket formed in the pocket member and various lead wires are connected to the thermal protector so that electrical power flowing to the windings may flow through the protector.

However, all of these various schemes for mounting relatively large physical size thermal protectors in a motor fail to take advantage of the various schemes for permitting automatic termination of the magnet wires forming the windings of the motor and oftentimes require additional jumper leads and the like and additional terminals on the motor starting switch. These additional leads can, of course, be accidentally misconnected, or the terminals on the leads or the starting switch may be damaged during handling or shipping of the motor so that it is not possible to make a proper connection or such that a failure would be likely to occur during operation of the motor.

SUMMARY OF THE INVENTION

Among the several objects and features of this invention may be noted the provision of an apparatus and system for terminating the winding wires of a dynamoelectric machine, such as a fractional horsepower motor or the like, which eliminates lead wire assemblies and connections thus reducing costs and improving the quality and reliability of the motor;

The provision of such apparatus and system which eliminates the requirement for a separate mounting clip or bracket for the thermal protector for the motor again reducing the cost and complexity of the motor;

The provision of such apparatus and system which permits a thermal protector to be inserted directly into a terminal connected to the magnet wire ends from the windings of the motor thus eliminating the number of connectors required so as to connect the windings to the thermal protector and to the motor starting switch;

The provision of such apparatus and system which eliminates or reduces the possibility of misconnecting various lead wires to the terminals of the thermal protector and to the motor starting switch;

The provision of such apparatus and system which lends itself to manufacturing operations in which the terminals connecting the magnet wires to the terminals may be automatically inserted into the receptacles of their respective terminal blocks;

The provision of such an apparatus and system in which the terminal blocks may be readily mounted on the core of the stator assembly and in which the terminal block does not interfere with the insertion of the windings into the slots of the stator core and in which the terminal block does not interfere with subsequent forming and blocking operations of the end turns of the windings;

The provision of such an apparatus and system in which the magnet wires from the windings are securely held in place extending across their respective receptacles of the terminal block until such time as the terminal is forceably inserted thereinto so as to prevent the magnet wires from becoming displaced from their respective terminals, regardless of the diameter of the magnet wire;

The provision of such an apparatus and system in which a relatively few terminal blocks accommodate a wide variety of magnet wire diameters;

The provision of such apparatus and system which permits the use of existing starting switches and yet permits leadless connections of the switch and the thermal protector to the motor windings;

The provision of such apparatus and system which prevents misconnection of the switch;

The provision of such apparatus and system which electrically isolates the terminals on the thermal protector and unused terminals on the switch;

The provision of such apparatus and system in which the components are keyed relative to one another so as to facilitate the lineup of the various terminals on interfitting parts so as to prevent overstressing of the terminals during assembly;

The provision of such apparatus and system which reduces the migration of airborne lint into the interior of the switch;

The provision of such apparatus and system which provides for rigid protection of winding wire terminal connection points;

The provision of such apparatus and system which integrates the mounting of a thermal protector without the requirement of a separate mounting clip therefor; and The provision of such apparatus and system which facilitates production, which lowers the cost of manufacturing the motor, and which leads to greater reliability and a longer service life for the motor.

Other objects and features will be in part apparent and in part pointed out hereinafter.

Briefly stated, this invention relates to a dynamoelectric machine having a stator with the stator including a core comprised of a stack of plate-like laminations of suitable ferromagnetic material. The core has a central bore therethrough and a plurality of slots extending generally radially outwardly from the bore. At least one coil made up of a plurality of turns of magnet wire is inserted into the slots thus constituting the windings of the motor. The winding has a first end and a second end of the magnet wire. A terminal block of electrical insulative material is affixed to the core, this terminal block having at least one receptacle therein and a slot in opposite sides thereof for receiving the magnet wire with the magnet wire extending across the receptacle. A terminal is insertable into the receptacle of the terminal block to make electrical contact with the magnet wire extending across the receptacle. Specifically, the improvement of this invention comprises the core having at least one aperture thereby to restrain the terminal block against translational movement relative to the one face of the core. The terminal block further has at least one finger extending from the terminal block in a direction generally radially inwardly of the core and bears against the one face of the core thereby to restrain the terminal block against tilting out of the plane of this one face of the core.

Another variation of this invention, as generally set forth above, includes a portion of the electrically insulative means or block defining the slots leading into the receptacles having flashing of the insulative material integral with the insulative means. This flashing at least partially closes the width of the slots and is of relatively thin thickness so that upon inserting the magnet wire in the slot the flashing is at least in part removed such that the remaining flashing firmly holds the magnet wire in place within the slot regardless of the thickness of the magnet wire until such time as the terminal is inserted into the receptacle.

In still another variation of this invention, the invention relates to a dynamoelectric machine or motor having a stator which includes a core comprised of a stack of plate-like laminations of suitable ferromagnetic material. The core has a central bore therethrough and a plurality of slots extending generally radially outwardly of the core. At least one coil made up of a plurality of turns of magnet wire is inserted in these slots, and thus constitutes the windings of the motor. The windings have a first and a second end of the magnet wire. A terminal block of electrically insulative material is affixed to the core, and the terminal block has a plurality of receptacles therein. The motor further has a rotor assembly received within the bore of the core and a rotor shaft. A support is secured to the core for receiving and journaling the rotor shaft. A switch for energizing and de-energizing at least a portion of the windings is provided. A centrifugally responsive means is provided for actuating the switch upon start-up and shutdown of the motor. The switch has at least one terminal extending sidewise therefrom. The switch is in operational relation with the centrifugal means, and is spaced axially along the rotor shaft from one face of the core. More specifically, the improvement of the present invention relates to the terminal block being mounted on one face of the core, and having a plurality of receptacle therein for receiving respective winding wires. A thermal protector is interposed between the terminal block and the switch, this thermal protector having a first terminal in electrical contact with at least one of the above-mentioned magnet wires received in the receptacles of the terminal block, and another terminal proximate the switch. Terminals means is carried by the terminal block for electrically and mechanically mating with the at least one switch terminal as the switch is moved inwardly an axial direction toward the core, such as upon installation of the switch thereby to make electrical contact with the terminals of the switch and the windings of the motor.

BRIEF DESCRIPTION OF THE DRAWINGS

FIG. 1 is a front elevational view of a stator assembly of a dynamoelectric machine made in accordance with the present invention with the windings of the motor shown in phantom and with an electrical insulative terminal block affixed to one face of the stator core in accordance with this invention;

FIG. 2 is a left side elevational view of the upper portion of the core assembly illustrated in FIG. 1;

FIG. 3 is an enlarged front elevational view of the terminal block shown in FIGS. 1 and 2;

FIG. 4 is a rear elevational view of the terminal block;

FIG. 5 is a left side elevational view of the terminal block, as it is viewed in FIG. 4;

FIG. 6A is a cross-sectional view of the terminal block taken along line 6—6 of FIG. 3 illustrating a magnet wire inserted in slots formed in the terminal block with the magnet wire extending across a respective receptacle and further illustrating apparatus for forceably inserting an electrical terminal into the receptacle thereby to make electrical contact with the magnet wire and to firmly secure the magnet wire in place within the receptacle of the terminal block, and to simultaneously trim or cut off the excess magnet wire;

FIG. 6B is a view of the terminal block similar to FIG. 6A illustrating an electrical terminal fully inserted into the receptacle and firmly securing the magnet wire in position in the terminal block;

FIGS. 7 and 8 are enlarged front elevational views taken on lines 7—7 and 8—8 of FIG. 3 illustrating, respectively, a single terminal receptacle and a double terminal receptacle;

FIG. 9 is a front elevational view of the outer lamination of the stator core illustrated in FIG. 1;

FIG. 10 is a right side elevational view of the outer lamination shown in FIG. 9;

FIG. 11 is a top plan view of the lamination shown in FIG. 9;

FIG. 12 is a top plan elevational view of another embodiment of a terminal block installed on one face of the core of a stator assembly and further illustrating a motor starting switch with a thermal protector installed between the terminal block and the motor starting switch;

FIG. 12A is a horizontal cross-sectional view of the alternative terminal block illustrated in FIG. 12, shown on a somewhat enlarged scale;

FIG. 13 is a front elevational view of the motor starting switch shown in FIG. 12;

FIG. 14 is a right side elevational view of the assembly shown in FIG. 12 further illustrating the stator assembly of the motor and further illustrating a centrifugal actuator mounted on the rotor shaft of the motor for operating the motor starting switch;

FIG. 15 is a rear elevational view taken along line 15—15 of FIG. 12;

FIG. 16 is a left side elevational view of FIG. 15;

FIG. 17 is a front elevational view on an enlarged scale of terminal block shown in FIGS. 12-16;

FIG. 18 is a cross-sectional view of one of the receptacles taken along line 18—18 of FIG. 7 particularly illustrating the provision of relatively thin flashing within the slot of the receptacle for forceably being deformed upon the insertion of a magnet wire thereby to positively hold the magnet wire within the slot until such time as a terminal, as shown in FIGS. 6A and 6B, may be inserted into the receptacle;

FIG. 19 is an end view of still another embodiment of a terminal block of the present invention, installed on one end face of the core of a stator assembly, and further illustrating a conventional motor starting switch, having terminals extending sidewise from the starting switch for electrical and mechanical mating with terminals carried by the terminal block, and further illustrating a thermal protector installed between the terminal block and the motor starting switch, with all connections of the starting switch and the thermal protector with the magnet wire constituting the windings of the motor and terminals being via the receptacles in the terminal block;

FIG. 20 is a vertical cross sectional view (on a somewhat enlarged scale), taken along line 20—20 of FIG. 19, illustrating a female terminal carried by the terminal switch bracket for making mechanical and electrical contact with the terminals extending sidewise from the starting switch;

FIG. 23 is a top plan view of the female terminal illustrated in FIG. 20, making mechanical and electrical contact with the standard terminals extending sidewise from the starting switch; and FIG. 24 is a side elevational view of the terminal shown in FIG. 23.

Corresponding reference characters indicate corresponding parts throughout the several views of the drawings.

DESCRIPTION OF PREFERRED EMBODIMENTS

Figure 21:
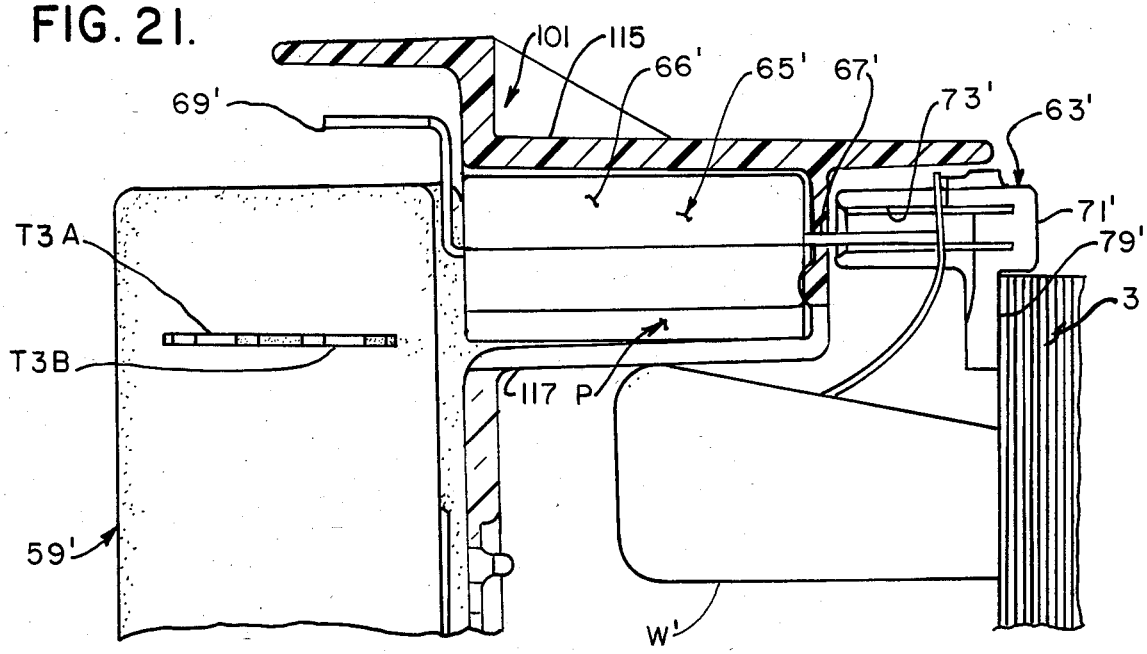
FIG. 21 is a vertical cross sectional view (also on a somewhat enlarged scale), taken along line 21—21 of FIG. 19, illustrating the relationship of the starting switch and the thermal protector in relation to the terminal block installed on the end face of the core.

Referring now to the drawings, and specifically to FIG. 14, a dynamoelectric machine (e.g., a fractional horsepower motor) is indicated in its entirety by reference character M. The motor includes a stator assembly, as generally indicated at 1, including a core 3 made up of a stack of plate-like laminations 5 of suitable ferromagnetic materials. As shown in FIGS. 1, 2 and 9, the laminations are assembled in a stack to form the core 3 and are physically held in stacked relation by a plurality of cleats 7 at the corners of the laminations. Each of the laminations has a central opening 9 therein which, when the laminations are assembled to form the core, form a central bore B extending longitudinally therethrough. Each of the laminations 5 has a plurality of notches (as best shown in FIG. 9) extending radially outwardly from central opening 9 and when the laminations are assembled in the core, these notches form radial slots 11 for receiving preselected coils of magnet wire which form the windings W. As is conventional, windings W are formed of one or more coil sets of magnet wire with each of the coil sets having a plurality of individual coils, each of which comprises a multiplicity of turns of the magnet wire, with the coils inserted in selected slots 11. The coil sets have magnet wire ends 13 which lead out from the coil and which, as is conventional, are intended to be connected to so-called power leads for the selected energization of the windings for operation of the motor.

As shown best in FIGS. 1 and 2, core 3 has an outer face (i.e., facing axially outwardly) with this outer face being indicated by reference character 15. A so-called electric insulative terminal block, as indicated in its entirety by reference character 17, is affixed to this outer face 15 of the core for receiving the magnet wire ends 13 and for enabling them to be readily connected to the above-mentioned lead wires by means of electrical terminals, as will be hereinafter described in greater detail. It will be understood, however, that by utilizing terminal block 17 and the electrical terminals inserted thereinto to make electrical contact between the magnet wire ends 13 and the lead wires (not shown), conventional soldered junctions between the lead wires and the magnet wire ends can be eliminated thus facilitating automated production of stator core 3 and further increasing the service life of the electric motor using such a stator core because the reliability of the electrical connections between the magnet wire ends 13 and lead wires is enhanced.

More specifically, as shown in FIGS. 3-8, electrical insulative terminal block 17 comprises a body 19, for example, injection molded out of a suitable synthetic resin electrical insulative material. The body has a plurality of receptacles, as generally indicated at 21, therein for receiving magnet wire ends 13 and an electrical terminal, as is best shown in FIG. 6A and 6B and as will be explained in detail hereinafter. Further, the body 19 has a plurality of slots S, one slot on each side of each receptacle 21, for receiving a respective magnet wire end 13 so as to hold the magnet wire across the receptacle as best shown in FIG. 3 and in FIG. 6A. Further, body 19 is provided with a plurality of ribs 23 on one side of the body to reinforce the portion of the body including receptacles 21 to the base of the mounting bracket body to increase the rigidity thereof. Body 19 further has a back face 25 which is adapted to mate with the outer face 15 of core 3. As best shown in FIGS. 4 and 5, a pair of spaced pins, as indicated at 27a, 27b, extend outwardly from body 19 for purposes as will appear. Each of these pins has a slot 28 extending therethrough so as to allow the diameter of the pin to be compressed for purposes as will appear. On the outside of each pin 27a, 27b, a respective aperture 29a, 29b is provided on body 19 so as to permit the electrical insulative terminal block to be securely mounted on face 15 of core 3.

Further, insulative block body 19 includes a central finger 31, which as shown in FIG. 1, extends downwardly on the outside face 15 of core 3 and is inserted into the windings W of stator core 1. It will be understood that with the electrical insulative terminal block 17 mounted on front face 15 of core 3, that finger 31 at least in part restrains tipping of the terminal block in forward or counterclockwise direction as shown in FIG. 2. Further, as best shown in FIGS. 3-5, terminal block 17 is provided with a plurality of so-called anvils 33, one for each of the receptacles 21. Each of these receptacles 21 has a pair of respective slots S on the outside of the terminal block so as to receive and support the outer end of a magnet wire 13 for purposes as will appear. Each of the receptacles 21 has a so-called pedestal 35 therewithin generally at the same height as the bases of the slots S extending from one side to the other of the receptacle for supporting the portion of the magnet wire in 13 inserted into the receptacle. Still further, electrical insulative block 17 is provided with a shoulder 37 on its back face which is intended to engage the upper face of the stator core (as best shown in FIG. 2) so as to prevent downward and radially inward movement of the electrical insulative block relative to stator core 3 when the electrical insulative block is affixed to the core in a manner as will appear.

Referring now to FIGS. 6A and 6B, the installation of a magnet wire end 13 in a receptacle 21 will now be described in detail. It will be understood that winding W of stator core 1 may have, for example, 6 different magnet wire ends 13 which are each received in a respective receptacle 21 and each of which is automatically terminated in a manner as will appear. More specifically, with terminal block 17 affixed to the front face 15 of stator core 3, as shown in FIGS. 1 and 2, the magnet wire ends 13 are placed in slots S of their respective receptacles so that the wires extend across the receptacle and out beyond the upper edge of the receptacle as shown in FIG. 1. Then, as shown in FIG. 6A, a so-called terminal insertion tool, as generally indicated at 39, is applied to the terminal block so as to forceably insert an electrical terminal, as generally indicated at 41, thereby to strip the electrical insulative varnish from magnet wire 13, to forceably insert both the magnet wire 13 and terminal 41 within the receptacle, and to make electrical contact with the magnet wire. Such a terminal and terminal insertion tool are more fully illustrated in U.S. Pat. No. 3,984,908. Such electrical terminals and terminal insertion equipment are commercially available from the assignee of the above-mentioned U.S. Pat. No. 3,984,908, AMP, Inc. of Harrisburg, Pa. under the trademark MAG-MATE. Reference may be made to this above-mentioned U.S. patent for a more complete description of both terminal insertion tool 39 and terminal 41. Generally, the terminal insertion tool includes a ram 43 which forceably drives terminal 41 into its respective receptacle 21 thereby to strip the electrical insulative varnish from the magnet wire and to forceably grip the magnet wire between pedestal 35 within the receptacle and a downwardly extending finger portion of the terminal (see FIG. 6B). Additionally, the terminal tool 39 includes a reciprocable blade 45 which is actuated after terminal 41 has been inserted into its receptacle and after the magnet wire 13 has been at least in part drawn down into the receptacle thereby to shear the magnet wire between the cutting edge of blade 45 and anvil 33. Further anvil 33 which is integrally molded with electrical insulative terminal block 17 is severed from the terminal block. In this manner, the magnet wire ends 13 can automatically be terminated by electrical terminals 41 and the excess length of magnet wire extending outwardly beyond the outside edge (i.e., the upper edge of terminal block as shown in FIGS. 1 and 2) may be trimmed thus allowing lead wires with terminals thereon (not shown) to be plugged directly onto a portion of terminal 41 extending outwardly from receptacles 21 and electrically insulative block 17.

In FIGS. 7 and 8, receptacles 21 provided in terminal block 17 are shown on an enlarged scale. More specifically, the receptacle 21 illustrated in FIG. 1 is a single receptacle for receiving a single terminal 41 whereas the receptacle illustrated in FIG. 8 is a so-called dual receptacle adapted to simultaneously receive a dual magnet wire terminal (not shown). As is further shown in FIGS. 7 and 8, the body portion 19 of terminal block 17 may be provided with indicia, as indicated at I, (i.e., numbers) so that the various receptacles or terminals provided in the receptacles can be properly labeled so as to permit motor assembly personnel and field service personnel to identify which leads and terminals should have various respective lead wires connected thereto.

Referring now to FIGS. 9-11, the outer lamination 5 of stator core 3 is shown in detail. More specifically, the lamination is shown to include the central opening 9 and a plurality of blind slots extending radially outwardly from the central opening thus forming a plurality of pole pieces or teeth T between each of the slots. As indicated at 47a, 47b at the top of the lamination 5 shown in FIG. 9, a pair of apertures is provided. Additionally, on the outside of the pair of apertures 47a, 47b, a pair of tabs 49a, 49b is struck from the lamination so as to extend outwardly beyond the front face 15 of outer lamination 5. It will be understood that these tabs 49a, 49b constitute means for securing terminal block 17 in place on the outer face 15 of core 3.

More specifically, upon installing terminal block 17 onto stator core 3, pins 27a, 27b are forceably inserted into apertures 47a, 47b of a number of (or all of) the laminations 5 constituting the stator core. The slot 28 in each of the pins 27a, 27b permits the pins to be compressed so that they fit tightly in apertures 47a, 47b. Additionally, shoulder 37 on the back face 25 of terminal block 17 bears on the upper face or edge of the stator core, as best shown in FIG. 2. Thus, pins 27a, 27b, finger 31 (as heretofore described), and shoulder 37 positively prevent translational and rotational movement of the insulative block 17 relative to stator core 3.

Further, when terminal block 17 is applied to the outer face of the stator core, tabs 49a, 49b are received in respective slots 29a, 29b of the terminal block. As best shown in FIG. 3, the tabs may be bent laterally outwardly, as shown by tab 49a, thereby to hold the terminal block in face to face engagement with the stator core. Alternatively, it will be understood that since laminations 5 of stator core 3 are made of relatively soft ferromagnetic steel material, the tabs 49a, 49b may be twisted about their longitudinal axis after they have been inserted through apertures 29a, 29b thereby to not only positively hold the terminal insulative block on the stator core, but further to draw the terminal insulative block into relatively tight or firm face-to-face engagement with the stator core. This twisting of the terminals is illustrated by the twisted tab 49b in FIG. 3.

It will be appreciated that terminal block 17 is affixed to the core and that magnet wire ends are inserted in receptacles 21 and that terminals 41 are installed thereby to securely hold the magnet wire ends in the terminal block while other operations in the manufacture of the stator assembly, such as blocking and forming of the winding and dipping and baking, are performed.

Referring now to FIGS. 12-17, dynamoelectric machine or motor M is further shown to comprise a rotor assembly 51 comprising a rotor body centered within and rotatable within bore B of stator core 3. A rotor shaft 55 extends axially outwardly from the rotor body. The rotor shaft is journalled in a bearing carried by a bearing support BS which is firmly affixed to stator core 3 and constitutes a portion of the stator. It will be understood that the bearing support BS maintains rotor assembly 51 in its desired position rotatable within bore B of the core. Additionally, a centrifugal actuator, as generally indicated at 57, is provided on rotor shaft 55 for actuating and de-actuating a so-called motor starting switch, as indicated generally at 59, in a manner well-known to those skilled in the art. Generally, in fractional horsepower electric motors, it is conventional to provide a main winding and an auxiliary winding which is energized only during startup of the motor so as to insure that the motor develops sufficient starting torque. However, after the motor comes up to a predetermined operating speed, the centrifugal actuator will de-energize the auxiliary winding via the starting switch. Likewise, on shutdown of the motor, upon the motor slowing down, the centrifugal actuator will again actuate the starting switch so that upon energization of the motor, the auxiliary windings will also be energized. Because the construction and operation of motor starting switches and of centrifugal actuators are well-known to those skilled in the motor art, a detailed construction of the centrifugal actuator and the starting switch has herein been omitted. However, it should be recognized that starting switch 59 does have a plurality of terminals, as indicated at 60, for connection to various lead wires and the like so as to permit selected energization of various coils or poles of windings W of the motor both upon startup of the motor and, in the instances of a multispeed motor, upon shifting speeds. Further, the starting switch conventionally has a switch actuating arm, as indicated at 61, which is cooperable with centrifugal actuator 57 thereby to actuate and deactuate the motor starting switch upon startup and shutdown of the motor.

As indicated generally at 63, a terminal block is mounted on the outer front face 15 of stator core 3. Terminal block 63 is generally similar in purpose and in construction to terminal block 17 heretofore described. Therefore, only significant structural and operating differences between terminal block 63 and terminal block 17 will be described in detail. It is conventional in fractional horsepower motors to connect a so-called thermal protector, as generally indicated at 65, in series with the windings of the motor so as to protect the windings of the motor from electrical overloads, such as in the event the rotor becomes locked or stalled. Generally, these thermal protectors are responsive to the current flowing through the windings or to the temperature of the windings, such that upon an excessive current flowing through the windings which, if continued over a period of time, would cause damage to the electrical insulation on the windings and thus would result in catastrophic failure of the motor. Specifically, these thermal protectors operate by opening the circuit energizing the windings of the motor thereby to automatically de-energize the motor and to stop the flow of current through the windings. However, once the thermal protector and the windings have cooled below a predetermined temperature level, the thermal protector will reset itself so that the motor may be restarted. While thermal protectors come in a variety of shapes and sizes, the thermal protector as indicated at 65 is a commercially available thermal protector manufactured by the Therm-O-Disc Division of the Emerson Electric Co., assignee of the present invention, of Mansfield, Ohio.

More specifically, thermal protector 65 includes a body 66 in which a thermally responsive member (not shown) is located so as to interrupt the flow of current through the thermal protector in the event the current exceeds a predetermined limit. Further, thermal protector 65 includes a first terminal 67 which extends outwardly from one end of thermal protector body 66 and another terminal, as indicated at 69, which extends outwardly in the opposite direction from the thermal protector body. Generally, these thermal protectors are of a relatively large size, e.g., 1.5 inches (3.8 cm.) square and approximately ⅜ inches (0.9 cm.) thick. It has heretofore been a packaging problem in the manufacture of fractional horsepower electric motors as to where to place these thermal protectors. Ideally, they should be located close to the windings of the motor so that they are responsive to the operating temperatures of the motor, and yet they have to be positioned relatively near the motor starting switch 59 so that connection to the switch is readily facilitated. Still further, it is desirable to rigidly mount motor starting switch 59 on bearing supports BS so that the switch is mounted in a predetermined position relative to centrifugal actuator 57 and so that the switch actuating arm of the starting switch will be reliably engaged by the centrifugal actuator 57 upon startup and shutdown of the motor. The particular construction and arrangement of terminal block 63, thermal protector 65, and motor starting switch 59, as illustrated in FIGS. 12–17 overcome many of the problems associated with the location of prior motor starting switches and thermal protectors and yet allow for automated termination of the magnet wire ends 13.

More specifically, terminal block 63 includes an insulative body 71 of suitable synthetic resin material. In the base portion of the body, a dual slot terminal receptacle 73 is provided and arms, as indicated at 75a, 75b, at each end of the base portion extend out beyond the main portion of the insulative body in a direction toward the motor starting switch 59 and each of these arms 75a, 75b has a respective receptacle, as indicated at 21, in the outer end face thereof as best shown in FIG. 17. More specifically, dual receptacle 73 is shown to be like the dual slot receptacle 21 heretofore described and shown in FIG. 8 and the receptacles in the outer end faces of arms 75a, 75b are generally similar in construction to the single receptacles 21 illustrated in FIG. 7. Insulative body 71 further has a back face 79 which is adapted to bear against the outer face 15 of core 3. As best shown in FIG. 14, arms 75a, 75b extend axially outwardly from face 15 of core 3 out beyond windings W toward the back face of starting switch 59. Further, the distance between arm 75a, 75b is shown in FIG. 12 to be somewhat greater than the width of thermal protector body 66.

As best shown in FIG. 12, starting switch 59 has a receptacle 81 formed in the top surface thereof adapted to receive and to support the outer end of thermal protector body 66. This receptacle is formed in part by a web 83 at the top of the starting switch and web 83 has an opening 85 therein (see FIG. 13) for receiving terminal 69 of thermal protector 65. It will be understood that the dual slot terminal receptacle 73 in the body portion of insulative mounting block 63 is adapted to receive a female terminal for making a common connection to two magnet wires received in the dual slot receptacle, with this terminal being similar to the terminal as indicated at 45 in FIGS. 6A and 6B and with these electrical terminals being female terminals adapted to receive terminal 67 extending outwardly from one side of thermal protector 65. Thus, this dual slot female terminal received in common receptacle 73 constitutes the common terminals for winding W of stator assembly 1.

Further, the body of starting switch 59 is securely mounted to a plate or other member 87 provided on bearing support BS of the stator assembly thereby to fixedly mount the starting switch in a desired operating position relative to centrifugal actuator 57. As shown in FIG. 12, the distance between the central body portion of terminal block 63 and the inside face of web 83 of starting switch 59 is sized so as to receive thermal protector 65. It will be appreciated, particularly as shown in FIG. 12, that arms 75a, 75b of terminal block 65 extend outwardly a considerable distance and thus bridge the distance between the back face of starting switch 59 and the terminal block. Further, as shown in FIG. 14, these arms overlie the end turns of windings W. As indicated at 89a, 89b, a pair of terminal extensions extend rearwardly from switch 59 and are received in female terminals 45 which are installed in receptacles 21 in the outer ends of arms 75a, 75b.

Upon assembling motor M as shown in FIG. 14, terminal block 63 is installed on stator core 3 after windings W have been inserted in the stator core in the well-known manner. Then, magnet wire ends 13 are installed in their respective receptacles 21 in arms 75a, 75b and in the dual slot terminal 73 in a manner generally similar to that described in regard to FIGS. 6A and 6B. Terminals 41 are then forceably installed in the receptacles thereby to fix the magnet wire ends 13. Then, thermal protector 65 is installed such that its terminal 67 is received within the female terminals 45 previously installed in common receptacle 73 thereby to make electrical contact between the male terminal 67 on the thermal protector and the magnet wires received in receptacle 73. After the thermal protector has been installed, starting switch 59 may be installed on plate 87 of bearing support BS so that its actuating arm 61 is in engagement with centrifugal actuator 57, such that terminal 69 of thermal protector 65 extends through opening 85 in web 83 of the housing of switch 59, and so that terminal extensions 89a, 89b of the switch housing extend into and are received within terminals 45 provided in receptacles 21 in arm 75a, 75b of terminal block 63. In this manner, it will be noted that the termination of magnet wires 13 from winding W is facilitated using the terminal 41, that thermal protector 65 is handily installed in close proximity to the windings W (as best shown in FIG. 14), and further that no jumpers or other wire connections are required to interconnect the starting switch 59 to the windings of the motor. Thus, all of these connections between the starting switch and the motor windings are accomplished either through the terminals of thermal protector 65 or through terminal extensions 89a, 89b.

It will be appreciated that individual lead wires (not shown) may be readily attached to the terminals 60 extending outwardly from the front face of starting switch 59. Alternatively, the lead wires, by means of a suitable electrical plug or the like, may be gang connected to the terminals 60 so as to speed connection of the lead wires to the starting switch and so as to eliminate the possibility of misconnecting the lead wires.

Referring to FIG. 18, which is an enlarged cross-sectional view taken on line 18—18 of FIG. 7, the portion of the core frame defining receptacle 21 has a slot S formed therein. Slot S has an enlarged upper trough portion 105 which is adapted to readily receive the magnet wire 13 and to guide it downwardly into the wire holding portion 107 of the slot. In accordance with this invention, the wireholding portion 107 of the slot has a frangible or deformable flashing, as indicated at F, integrally formed therein which at least partially blocks or fills the wire holding portion 107 of the slot. Thus, upon forcing magnet wire 13 down into the wireholding portion 107 of the slot 105, the flashing F is broken away or deformed such that the flashing conforms tightly with the diameter of the magnet wire 13 regardless of its diameter of the magnet wire. This insures that the magnet wire is gripped tightly by the flashing regardless of its diameter so that upon handling of the stator core 3 with the windings inserted therein and with the magnet wire ends 13 inserted in their respective slots S, prior to the installation of terminals 41, the magnet wires 13 will not become displaced from their respective slots and keeps the wires centered relative to its pedestal 35. However, it will be understood that upon installation of the terminals 41, as is generally shown in FIGS. 6A and 6B, the magnet wires will be readily drawn down into their respective receptacles such that the magnet wires bear against the upper surface of their respective pedestal 35 and such that the terminal 41 makes good electrical contact therewith. Of course, receptacles 21 may include anvils 33 such that the excess length of magnet wire extending out beyond the receptacle may be severed upon installation of the terminals.

While receptacles 21 with flashing F were described in conjunction with insulator 17, it will be understood that this flashing for holding magnet wire ends 13 can be used in conjunction with any of the terminal blocks herein disclosed. It will be appreciated that if flashing F, as described above, is utilized in conjunction with the slots of terminal 17, one size of terminal 17 can be utilized with a wide variety of sizes of magnet wire and thus different terminals 17 with a slot sized for each gauge of magnet wire is not required.

Referring now to still another embodiment of the present invention, as illustrated in FIGS. 19–24, this other embodiment includes a terminal block 63', a thermal protector 65', and a motor starting switch 59'. Generally, the embodiment shown in FIGS. 19–24 is similar in concept and in operation to the embodiments of FIGS. 12–18 heretofore described, with the "primed" reference characters of FIGS. 19–24 indicating parts having a construction and a function similar to the parts heretofore described in regard to the embodiments of FIGS. 12–18.

In FIGS. 12–18, starting switch 59 is of a special construction particularly adapted to have its terminals 60 extend outwardly from the front face of the switch housing (as best shown in FIGS. 12–14), and to have web 83 along its top, with opening 85 therethrough for permitting the protector terminal 69 to project forwardly through the web. The embodiment of FIGS. 19–24 uses a conventional starting switch 59', as may be typically used on conventional electrical motors, having terminals T1A, T1B-T5A, T5B, extending out the sides thereof. The side terminals T1A, T1B-T5A, T5B, of switch 59' serve the double function of electrically interfacing the switch with the power and motor leads (not shown). Still further, the use of a conventional starting switch 59' eliminates the need for web 83 and opening 85 of the switch 59, shown in FIGS. 12–18, thus obviating the requirement of a specially constructed starting switch, and eliminating a significant portion of the cost of the embodiment shown in FIGS. 12–18.

More specifically, the embodiment shown in FIGS. 19–24 includes a so-called switch bracket assembly, as generally indicated by reference character 101, interposed between terminal block 63' and switch 59'. This bracket, at least in part, houses thermal protector 65' and overlies a portion of switch 59' thereby to protect the protector and the switch from undue accumulations of airborne lint or other solid contaminants which may be present in the air surrounding the motor, depending on its application. It will be appreciated that in certain applications, such as in electric clothes dryers or the like, airborne lint poses a significant environmental concern for long service life of the switch. Additionally, bracket 101 provides a rigid protection for terminal block 63' affixed to the stator 3, and for the electrical and mechanical connections of switch 59' to terminal block 63'.

Referring now to terminal block 63', it, like terminal block 63 heretofore described, has an insulative body 71' of a suitable synthetic resin material. The base portion of terminal block of 63' includes a so-called dual slot terminal receptacle 73', and has arms, as indicated at 75a', 75b', at each end of the base portion which extend out beyond the base portion of the body in a direction toward motor starting switch 59'. Each of these arms has a respective receptacle, as indicated at 21', in the outer end face thereof, as best shown in FIG. 20. Dual slot terminal receptacle 73' and the receptacles 21' in arms 75a', 75b' are generally similar in construction to the single receptacle 21 illustrated in FIG. 7. Body 71' has a back face 79' which is adapted to bear against the outer face of core 3 of the stator. Generally, the distance between arms 75a', 75b' (as shown in FIG. 22) is somewhat greater than the width of thermal protector body 66', such that the thermal protector 65' can readily be accommodated between these arms.

Starting switch 59' includes a housing H molded of a suitable electrically insulative synthetic resin material. The switch 59' includes terminals T1A, T1B-T5A, T5B, which extend outwardly from opposite sides of the switch housing H for connections to lead wires (not shown) supplying power to the switch, and for supplying power to windings W' via the winding connections in receptacles 73' and 75a', 75b' of terminal block 63'.

As heretofore noted, thermal protector 65' is generally similar to thermal protector 65 heretofore described, with the primary exception being the construction of terminal 69' extending upwardly and outwardly from the front edge of the thermal protector 65', as shown in FIG. 21. More specifically, terminal 69' is vertically offset (as shown in FIG. 21) from its entrance into thermal protector housing 66' so as to be spaced above the top surface of switch housing H thereby to permit a connector on a lead wire (not shown) to be readily connected to terminal 69'. As best shown in FIGS. 21 and 22, a male terminal 67', extending outwardly from the rear end of thermal protector housing 66, is received in the dual terminal receptacles 73' for electrical connection with the windings also received in receptacle 73' in the manner heretofore described.

Figure 22:
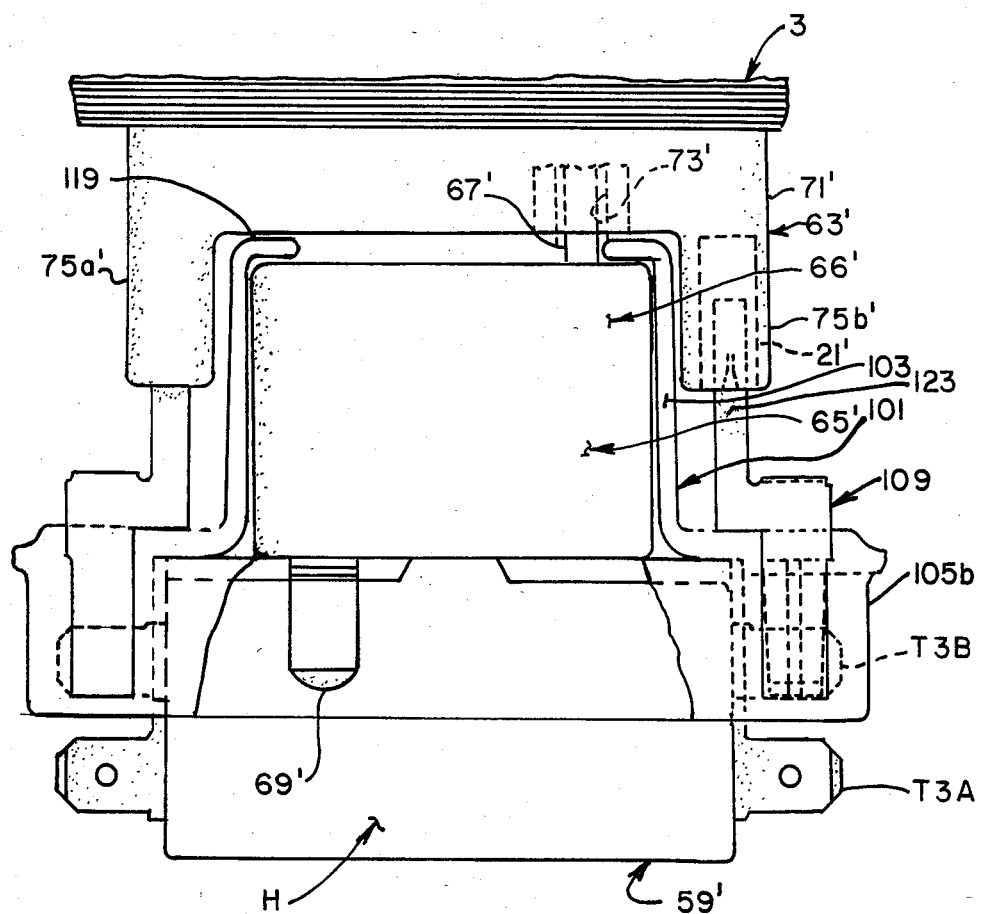
FIG. 22 is a top plan view taken along line 22—22 of FIG. 19, illustrating a portion of the core, the terminal block, the starting switch, and the thermal protector installed between the terminal block and the starting switch.

As heretofore mentioned, the embodiment of FIGS. 19–24 includes the provision of a so-called bracket assembly 101, interposed between terminal block 63' as it is applied to the outward face of core 3 and starting switch 59'. Bracket assembly 101 includes a unitary body 103, preferably molded of an electrically insulative synthetic resin material. Body 103 includes a pair of spaced arms, as indicated at 105a, 105b, on opposite sides of thermal protector 65, as best shown in FIGS. 19 and 22. These spaced arms have terminal receptacles 107a, 107b, respectively, formed therein for receiving appropriate terminals 33 to connect to magnet wires from windings W', via terminals 109 and for making electrical connection with the starting switch via a female portion of the terminal, generally indicated at 109. The construction of terminal assembly 109 is best shown in FIGS. 20 and 22–24, and will be described in detail hereinafter.

Further, bracket body 103 includes a channel 111 at one side of the cover body 103 (i.e., the right side, as viewed in FIG. 19), with this channel having a channel opening 113 therewithin for reception of a pair of terminals (e.g., terminals T4A, T4B) of switch 59' thereby to electrically isolate these terminals from the terminals T3A, T3B, and terminals T5A, T5B, located immediately above and below the channel 111. As shown in FIGS. 20 and 21, a top wall 115, integral with bracket body 103, overlies thermal protector 65' and the rear edge of the top wall extends out over and overlies at least a portion of terminal block 63'. The bracket body further includes a partial bottom wall 117 (as best shown in FIG. 21) so as to hold and support the thermal protector 65' and allowing radiant heat from windings W' to be received and sensed by thermal protector 65'. Still further, the bracket body includes a back wall 119 which forms a pocket P for receiving thermal protector 65'.

Referring now FIGS. 20 and 22–24, female terminal 109 is shown to comprise a one-piece terminal formed of a resilient, electrically conductive metal alloy, having a spring biased clip 121 which grips a respective terminal (e.g., terminal T3B) of switch 59' thereby to provide electrical connection between the switch terminal and the windings W' of the motor. A male terminal portion 123 extends rearwardly from female clip 121, and is adapted to be received in receptacle 21' of arms 75a, 75b', for making electrical connection with a respective winding magnet lead wire, as best shown in FIG. 20. Additionally, a unitary resiliently biased barb 125 is provided on one surface of female clip 121 for resiliently and forceably engaging the inner surface of openings 107a, 107b of arms 105a, 105b thereby to permit the insertion of the terminal into the openings 107a, 107b from the rear end of the openings (i.e., from the right-hand side of the openings, as shown in FIG. 20). Barb 125 positively engages the surfaces of bracket body 103 defining openings 107a, 107b, thereby to positively prevent movement of terminal 109 in a direction inwardly toward terminal block 63'. In this manner, the terminal is positively prevented from moving relative to bracket assembly 101, as switch 59' is moved in axial direction, and as the terminals of the switch are forceably brought into engagement with terminal clips 121.

Upon assembly of motor M, terminal block 63' is installed on core 3 in the manner heretofore described in regard to terminal block 63', and magnet wires from windings W' are inserted in receptacles 21 and in 73 in the manner heretofore described in regard to FIGS. 1, 2, and 9. Then, bracket assembly 101 complete with terminals 109 is inserted in receptacles 107a, 107b in the manner heretofore described, and thermal protector 65' is inserted in pocket P with the rearward protruding terminals 67' received in terminal receptacle 73'. Staring switch 59' is secured to bracket 101 by mounting screws (not shown) in the conventional manner. The switch 59' and bracket 101 are then moved into position in front of windings W and in front of terminal block 63' such that male terminals 123 of terminals 109 and terminal 67' of thermal protector 65' are in register with receptacles 21' of arms 75a', 75b' and with receptacle 73' of terminal block 63', respectively. The terminals are inserted in these receptacles so as to mount bracket assembly 101 relative to terminal block 63', and to make electrical connection with the winding W' ends and the terminals 109 and to make electrical connection of protector terminal 67' with the dual slot terminal block 63'. It will be understood that protector 65' is mounted in pocket P of bracket assembly 101 and switch 59' is secured to the bracket assembly before the latter is mounted to stator 3. In this manner, protector 65' is held in pocket P. Terminals 109, which are pre-inserted into receptacles 107a, 107b, make contact with their respective motor contacts T1A, T1B and T3A, T3B. With winding magnet wire ends WE (see FIG. 20) inserted in receptacles 21' of terminal block 63', male terminals ends 123 of terminals 109 make electrical contact with the winding magnet wire ends. Also, with switch 59' properly positioned relative to the motor so that the actuator 61' of switch 59' may be operated by a centrifugal actuator and linkage arrangement (not shown in FIGS. 19-24) for operation of the switch in the normal manner. In this manner, power leads (not shown) may be connected to the switch terminals in the conventional manner. Also, since the switch is physically keyed to the motor via bracket assembly 101 and terminals 109, and since the winding ends WE are positively connected to terminal block 63', misconnections of the switch 59' to motor windings W' is prevented.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

I claim:

1. In a dynamoelectric machine having a stator, the latter including a core comprised of a stack of plate-like laminations of suitable ferromagnetic material, said core having a central bore therethrough and a plurality of slots extending generally radially outwardly of the core, at least one coil made up of a plurality of turns of magnet wire inserted in said slots thus constituting the windings of the motor, said winding having a first and a second end of said magnet wire, a terminal block of electrically insulative material affixed to said core, a plurality of receptacles therein, said dynamoelectric machine further having a rotor assembly received within said bore of said core and a rotor shaft, a support secured to said core for receiving and journalling said rotor shaft, a switch for energizing and de-energizing at least a portion of said winding, centrifugal responsive means for actuating said switch upon startup and shutdown of said dynamoelectric machine, said switch having at least one terminal extending sidewise therefrom, said switch being in operational relation with said centrifugal means and being spaced axially along said rotor shaft from one face of said core, wherein the improvement comprises: said terminal block being mounted on said one face of said core and having a plurality of receptacles therein for receiving a respective wire from said windings therein, said receptacles each being adapted to receive a terminal thereby to make electrical connection with a respective winding wire, a thermal protector interposed between said terminal block and said switch, said thermal protector having a first terminal in electrical contact with at least one of said magnet wire terminals received in said receptacles of said terminal block and another terminal proximate said switch, terminal means carried by said terminal block for electrically and mechanically mating with said at least one switch terminal thereby to make electrical contact between the switch terminals and the windings.

2. In a dynamoelectric machine as set forth in claim 1 wherein said terminal block has an extension at each side of said thermal protector extending generally axially outwardly from said core towards said switch, each of said extensions having a receptacle therein for receiving a respective magnet wire from said windings and for receiving one of said terminal means for electrical contact with said winding wire whereby all of the required electrical connections between said switch and said windings are made by said terminal means.

3. In a dynamoelectric machine as set forth in claim 1 wherein said core has at least one aperture and one face thereof facing toward said switch, and wherein said terminal block has at least one pin extending therefrom for reception in said at least one aperture and for at least in part mounting said terminal block on said core.

4. In a dynamoelectric machine as set forth in claim 1 wherein said electrically insulative material from which said terminal block is made is a molded synthetic resin, and wherein each of said receptacles in said terminal block has at least one slot therein for receiving said winding wire with the latter extending across said receptacle, a portion of said terminal block defining said at least one slot having flashing of said insulative material integral with said terminal block, said flashing at least partially closing the width of said at least one slot and being relatively thin so that upon inserting said magnet wire in said at least one slot said flashing is at least in part removed such that the remaining flashing firmly holds the magnet wire in place in said slot regardless of the width of said magnet wire.

5. In a dynamoelectric machine as set forth in claim 1 further comprising a unitary bracket assembly of electrically insulative material interposed between said terminal block as it is installed on said core and said switch, said bracket assembly receiving said thermal protector and having means on at least one side of said switch for holding and mounting said terminal means.

6. In a dynamoelectric machine as set forth in claim 5 wherein said switch has a plurality of terminals extending sidewise therefrom, said terminal means carried by said bracket assembly engaging said switch terminals for securement of the switch to the bracket.

7. In a dynamoelectric machine as set forth in claim 6 wherein said bracket assembly has a male terminal extending therefrom, said male terminal being in electrical contact with at least one of said switch terminals, and wherein said terminal block has a receptacle for receiving an end of said magnet wire and means for making electrical contact between said male terminal and said end of said magnet wire upon insertion of said male terminal in said receptacle.

* * * * *